United States Patent [19]

Sasser

[11] Patent Number: 5,791,858
[45] Date of Patent: Aug. 11, 1998

[54] VEHICLE MOUNTED GAME SKINNING DEVICE

[76] Inventor: Kenneth W. Sasser, 3775 A Poe Rd., Chunchula, Ala. 36521

[21] Appl. No.: 889,234

[22] Filed: Jul. 8, 1997

[51] Int. Cl.⁶ .................................................. A22B 5/06
[52] U.S. Cl. ...................................... 414/462; 452/187
[58] Field of Search ............................. 414/462; 452/185, 452/187, 192

[56] References Cited

U.S. PATENT DOCUMENTS

| | | | |
|---|---|---|---|
| 4,338,703 | 7/1982 | Tanner | 452/187 |
| 4,806,063 | 2/1989 | York | 414/462 |
| 5,211,526 | 5/1993 | Robinette | 414/550 |
| 5,211,601 | 5/1993 | Cope | 452/187 |
| 5,366,338 | 11/1994 | Mortensen | 414/563 |
| 5,395,284 | 3/1995 | Frisk | 452/187 |
| 5,419,672 | 5/1995 | Poe | 414/540 |
| 5,456,564 | 10/1995 | Bianchini | 414/462 |

Primary Examiner—Karen M. Young
Assistant Examiner—Gregory A. Morse
Attorney, Agent, or Firm—Henderson & Sturm

[57] ABSTRACT

A vehicle mounted game skinning device 10 comprising a vertical support unit 11 having a hitch connection member 30 connected on one end to a vehicle hitch 101 and connected on the other end to a vertical column member 20 which slideably receives a boom arm member 40 and a winch unit 12 mounted on the vertical support unit 11 and provided with a game gambrel 80 for raising and lowering game animals.

4 Claims, 1 Drawing Sheet

VEHICLE MOUNTED GAME SKINNING DEVICE

CROSS REFERENCE TO RELATED APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The present invention relates to the field of vehicle mounted lifting devices in general, and in particular to a collapsible pulley system that engages the trailer hitch of a vehicle and is used for skinning wild game.

2. Description of Related Art

As can be seen by reference to the following U.S. Pat. Nos. 5,211,526; 5,366,338; 5,419,672; and 5,456,564, the prior art is replete with vehicle mounted lifting devices.

While all of the aforementioned prior art constructions are more than adequate for the basic purpose and function for which they have been specifically designed, they are uniformly deficient with respect to their failure to provide a simple, efficient, and practical device that can be used in conjunction with a Class II or Class III trailer hitch to lift and suspend game animals for the purpose of "skinning out" the animals.

As most deer hunters are aware, once an animal has been field dressed and removed from the kill site, the next step in processing the game animal is to skin the animal to allow the carcass to cool prior to butchering.

While most hunters have the physical strength to drag a deer on their own to a location where a vehicle can be driven to continue the transport of the animal, several problems arise particularly in hot weather which dictate that the animal be skinned as soon as possible.

Obviously, the hunter does not want to skin the animal at the kill site and then drag the skinned carcass to the vehicle pick up site since the animal's skin will protect the meat from being torn and contaminated with dirt and debris during the dragging process.

In addition, there are many instances wherein the closest access point for the vehicle to pick up the carcass is an area devoid of trees or other means wherein the animal can be suspended in order to be skinned.

Furthermore, even in those instances where trees are abundant a lone hunter may find it difficult, if not impossible, to raise the animal a sufficient height off of the ground to perform an adequate job of skinning out the animal.

As a consequence of the foregoing situation, there has existed a longstanding need for a new and improved hoist device that can be attached to the trailer hitch of a vehicle to allow a single individual to hoist and suspend an animal carcass at a desired height for the purposes of skinning and the provision of such a construction is a stated objective of the present invention.

BRIEF SUMMARY OF THE INVENTION

Briefly stated, the vehicle mounted game skinning device comprises a vertical support unit operatively connected to a winch unit that is provided with a game gambrel for raising and lowering game animals during the skinning process.

As will be explained in greater detail further on in the specification, the vertical support unit includes a vertical column member which telescopically receives a boom arm member on one end and telescopically receives a hitch connection member on the other end. The hitch connection member is also operatively received in the vehicle hitch member.

In addition, both the column member and the hitch connection member have a generally L-shaped configuration including a leg segment and a foot segment wherein the leg segments are slideably connected relative to one another.

Furthermore, the winch unit comprises a winch member and at least one pulley member connected to the vertical column member and at least one pulley member connected to the boom arm member. A winch cable extends from the winch member to a game gambrel for raising and lowering a game animal.

BRIEF DESCRIPTION OF THE SEVERAL VIEWS OF THE DRAWINGS

These and other attributes of the invention will become more clear upon a thorough study of the following description of the best mode for carrying out the invention, particularly when reviewed in conjunction with the drawings, wherein.

DETAILED DESCRIPTION OF THE INVENTION

Figure 1:
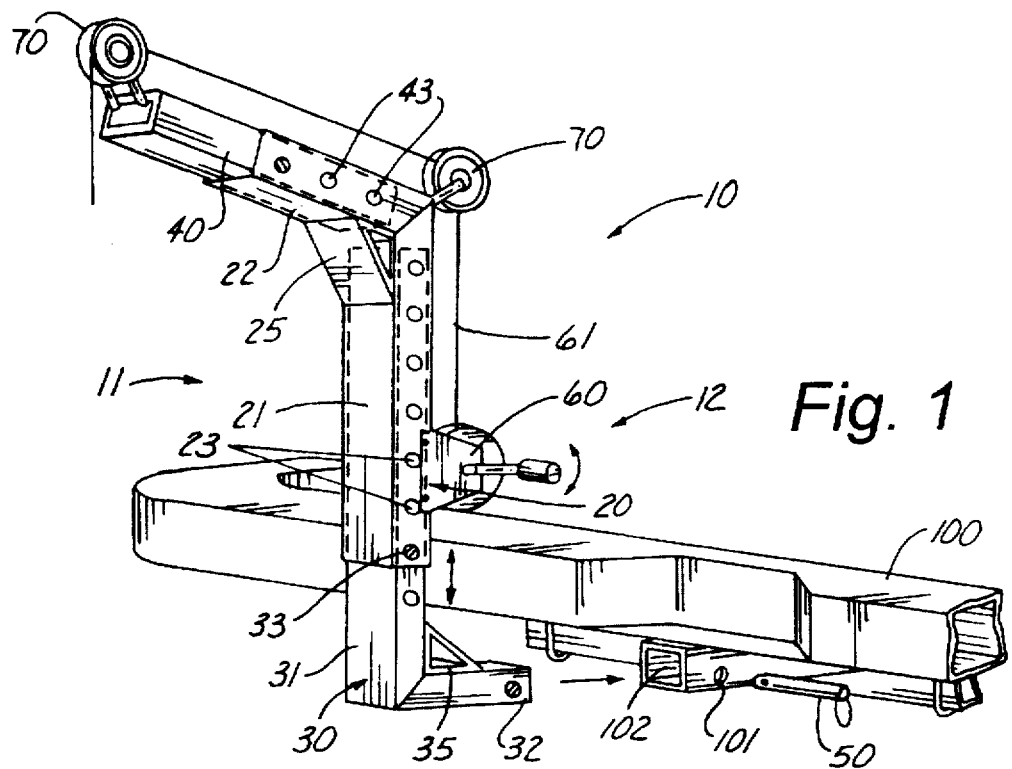
FIG. 1 is a perspective view of the vehicle mounted game skinning device that forms the basis of this invention.

As can be seen by reference to the drawings, and in particularly to FIG. 1, the vehicle mounted game skinning device that forms the basis of the present invention is designated generally by the reference number 10. The device 10 is designed specifically for use with a Class II or Class III trailer hitch 101 mounted on the rear of a vehicle 100. In addition, the device 10 comprises in general, a collapsible support unit 11 and a winch unit 12. These units will now be described in seriatim fashion.

Figure 2:
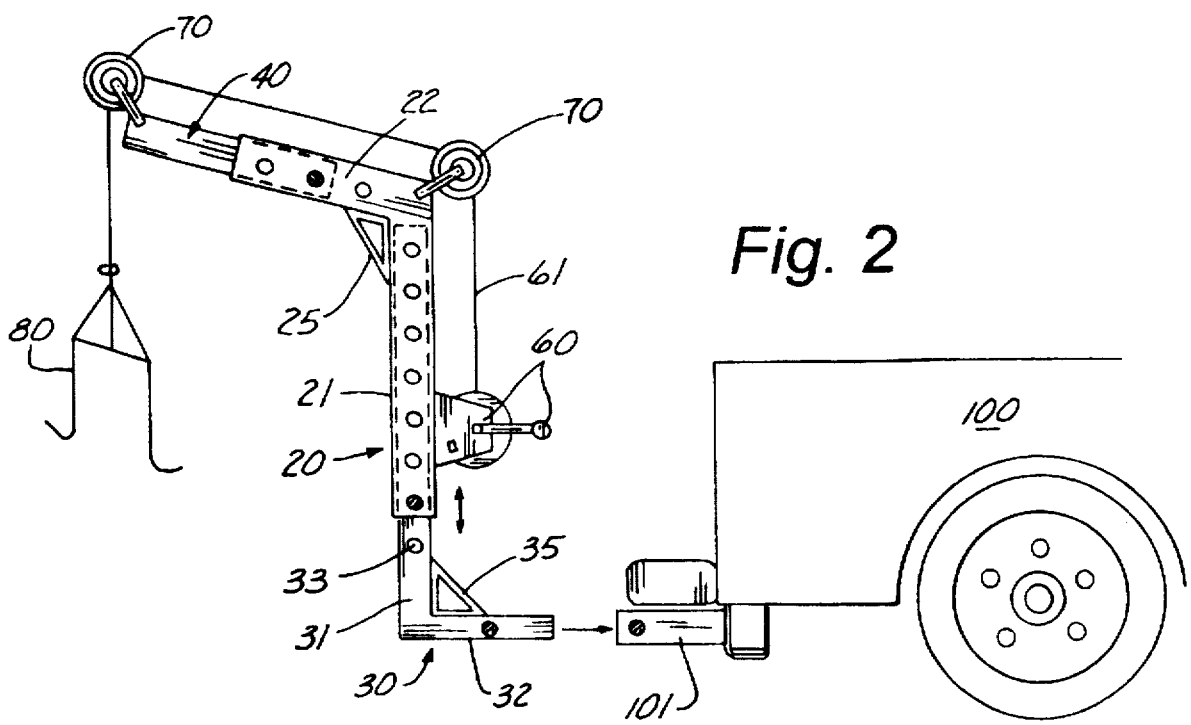
FIG. 2 is a side plan view of the device.

As shown in FIGS. 1 and 2, the vertical support unit 11 comprises a generally inverted L-shaped vertical support column member 20, an L-shaped hitch connection member 30 and a boom arm member 40 which are operatively and adjustably connected to one another.

The vertical support column member 20 has an elongated hollow vertical leg segment 21 and a shorter hollow foot segment 22 wherein both the leg segment 21 and the foot segment 22 are provided with a plurality of spaced apertures 23 whose purpose and function will be described in greater detail further on in the specification.

In addition, the L-shaped hitch connection member 30 is also provided with an elongated generally solid leg segment 31 and a shorter generally solid foot segment 32 wherein both the hitch leg 31 and foot 32 segments are also provided with a plurality of spaced apertures 33. The hitch leg segment 31 is dimensioned to be slideably received in the column leg segment 21 and the hitch foot segment 32 is dimensioned to be slideably received in the opening 102 in the vehicle trailer hitch 101.

Furthermore, both the column support member 20 and the hitch attachment member 30 are provided with a reinforcement wedge element 25, 35 at the junction between the leg and foot segments 21, 22 and 31, 32 respectively. The boom arm member 40 is also provided with a plurality of apertures 43 and is dimensioned to be slideably received in the foot segment 22 of the vertical column member 20.

As can be appreciated by reference to FIGS. 1 and 2, the boom arm member 40 and the leg 31 of the hitch connection member 30 are selectively positioned within the column support member 20 by inserting conventional locking pin elements 50 into the aligned apertures 23, 33 and 43. In addition, the foot 32 of the hitch connection member 30 is also secured within the vehicle hitch 101 in a similar manner.

As a consequence of the foregoing situation, the boom arm member 40 and hitch connection member 30 may be extended and retracted relative to the support column member 20 depending on whether or not the device 10 is to be operatively deployed or transported with in the vehicle 100 in a stored position.

As shown in FIGS. 1 and 2, the winch unit 12 comprises a winch member 60 and a plurality of pulley members 70. The crank operated winch member 60 and at least one of the pulley members 70 are connected to the column support member 20. At least one pulley member 70 is provided on the outboard end of the boom arm member 40. A winch cable element 61 is then operatively connected from the winch member 60 and the pulley members 70 to a game gambrel 80 for raising and lowering a game animal in a well recognized fashion for skinning.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooded parts together, whereas, a screw employs a helical surface, in the environment of fastening wooden parts, a nail and a screw may be equivalent structures.

Having thereby described the subject matter of the present invention, it should be apparent that many substitutions, modifications, and variations of the invention are possible in light of the above teachings. It is therefore to be understood that the invention as taught and described herein is only to be limited to the extent of the breadth and scope of the appended claims.

I claim:

1. A vehicle mounted game skinning device for use with a vehicle hitch to raise and lower a game animal for skinning wherein the device comprises:

an adjustable height and length vertical support unit including a vertical column support member, having a vertical leg segment and an angled foot segment; a boom arm member selectively positioned relative to said column angled foot segment; and a hitch connection member selectively positioned on one end relative to the vertical leg segment of the column member and operatively attached on the other end to said vehicle hitch; wherein the hitch connection member has a generally L-shaped configuration including a leg segment which is slidably received in the column leg segment and a foot segment which is operatively received in said vehicle hitch; and a winch unit operatively associated with said vertical support unit and provided with a game gambrel for raising and lowering a game animal.

2. The device as in claim 1 wherein the column support member is selectively connected to both the boom arm member and the hitch connection member by locking pin elements.

3. The device as in claim 1 wherein the boom arm member is telescopically received in the column foot segment and a portion of the hitch connection member is telescopically received in the column leg segment.

4. The device as in claim 1 wherein the winch unit comprises a winch member and at least one pulley member disposed on the vertical column member and at least one pulley member disposed on the boom arm member.

* * * * *